Nov. 9, 1954 W. S. DRUZ ET AL 2,694,103

SUBSCRIPTION TELEVISION TRANSMITTER
VIDEO-SIGNAL BLANKING STAGE

Filed June 16, 1950 4 Sheets-Sheet 1

WALTER S. DRUZ
JAN H. PULLES
*INVENTORS*

BY Francis W. Crotty
THEIR ATTORNEY

WALTER S. DRUZ.
JAN H. PULLES
*INVENTORS.*

BY Francis W. Crotty
THEIR ATTORNEY

WALTER S. DRUZ.
JAN H. PULLES
*INVENTORS.*

BY Francis W. Crotty

THEIR ATTORNEY

WALTER S. DRUZ.
JAN H. PULLES.
*INVENTORS.*

BY Francis W. Crotty
THEIR ATTORNEY

United States Patent Office 2,694,103

Patented Nov. 9, 1954

2,694,103

SUBSCRIPTION TELEVISION TRANSMITTER VIDEO-SIGNAL BLANKING STAGE

Walter S. Druz and Jan H. Pulles, Chicago, Ill., assignors to Zenith Radio Corporation, a corporation of Illinois Application June 16, 1950, Serial No. 168,582

10 Claims. (Cl. 178—5.1)

This invention relates to subscriber television systems, and more particularly to an improved video-signal blanking stage for use in a subscription type television transmitter for preventing distortion that might otherwise arise in the transmitted coded television signal.

Patent No. 2,547,598, issued April 3, 1951, in the name of Erwin M. Roschke, entitled "Image Transmission System," and assigned to the present assignee, discloses a subscription television system wherein the transmitted tlevision signal is coded by altering the relative timing of the video and synchronizing components during spaced intervals. A key signal, indicating the times of occurrence of these spaced intervals, is generated at the transmitter and distributed to subscriber receivers, as for example by means of a line circuit. The key signal is utilized at the various receivers to actuate decoding apparatus and enable the receivers to decode and reproduce the coded subscription television signal. It has been found that when the coded television signal of this system is corrected at a subscriber receiver, a flicker sometimes appears in the reproduced image. This flicker is caused by the inequality of picture content in sucessive video fields of the television signal as the timing of the video components relative to the synchronizing components is altered in accordance with the coding schedule. Such inequality of picture content gives rise to a low-frequency signal that may not be translated faithfully by the various stages of the transmitter, thus producing distortion in the coded television broadcast which results in the aforementioned flicker in the image reproduced.

An arrangement for eliminating the above-described condition is disclosed in copending application Serial No. 31,345, filed September 8, 1948, and issued March 23, 1954, as Patent 2,673,237, in the name of Pierce E. Reeves, entitled "Subscriber Transmission System" and assigned to the present assignee. This arrangement includes a video-signal blanking stage which blanks a predetermined portion of each line of video signal, this portion being changed whenever the timing of the video components of the television signal is altered in accordance with the coding schedule. The present invention is directed to an improved video-signal blanking stage suitable for use in the arrangement disclosed in the Reeves' application.

It is, accordingly, an object of the present invention to provide an improved video-signal blanking stage which may be used in a subscription type television transmitter to eliminate distortions that sometimes occur in the subscription broadcast.

Figure 1:
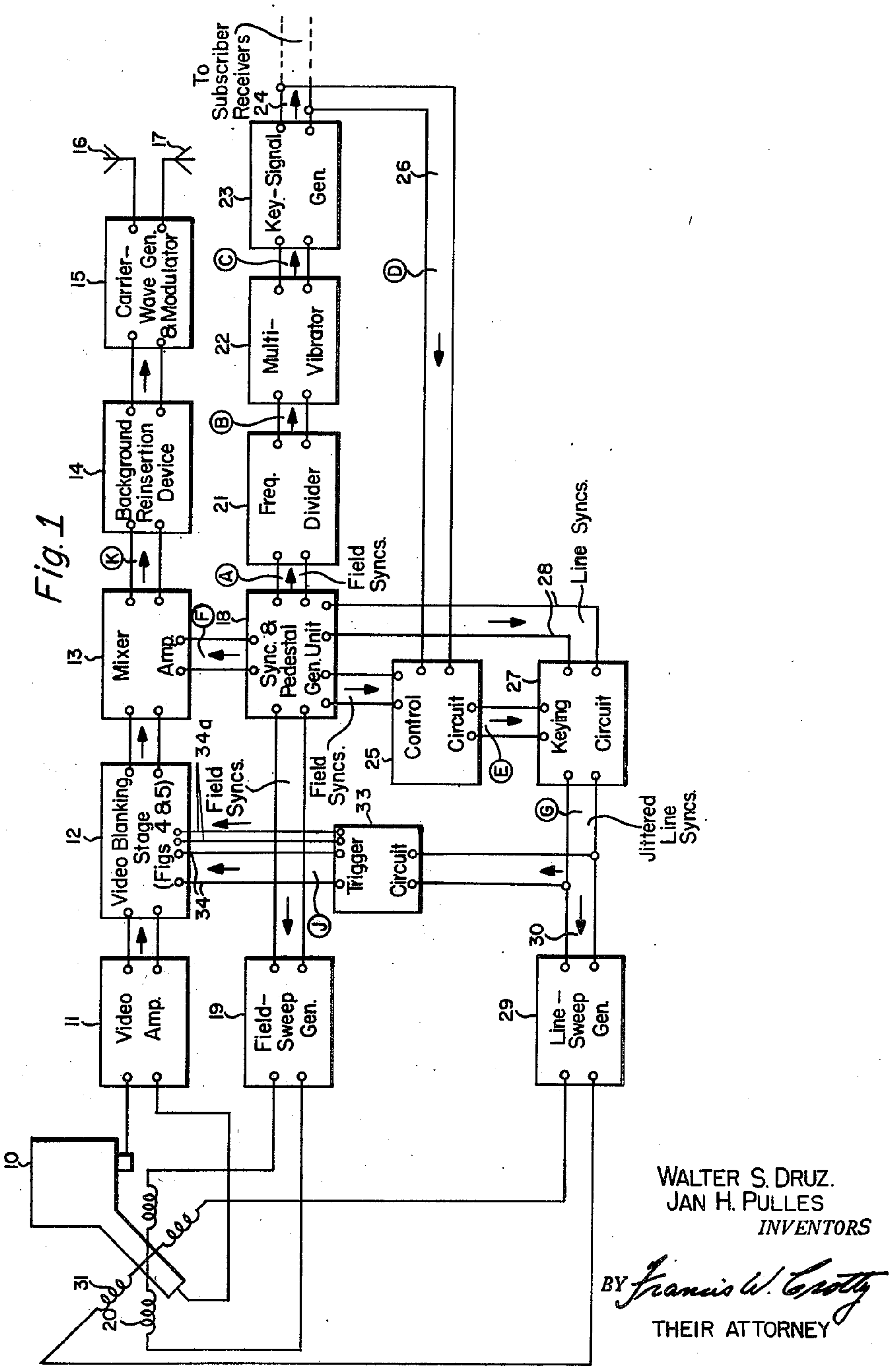
Figure 2:
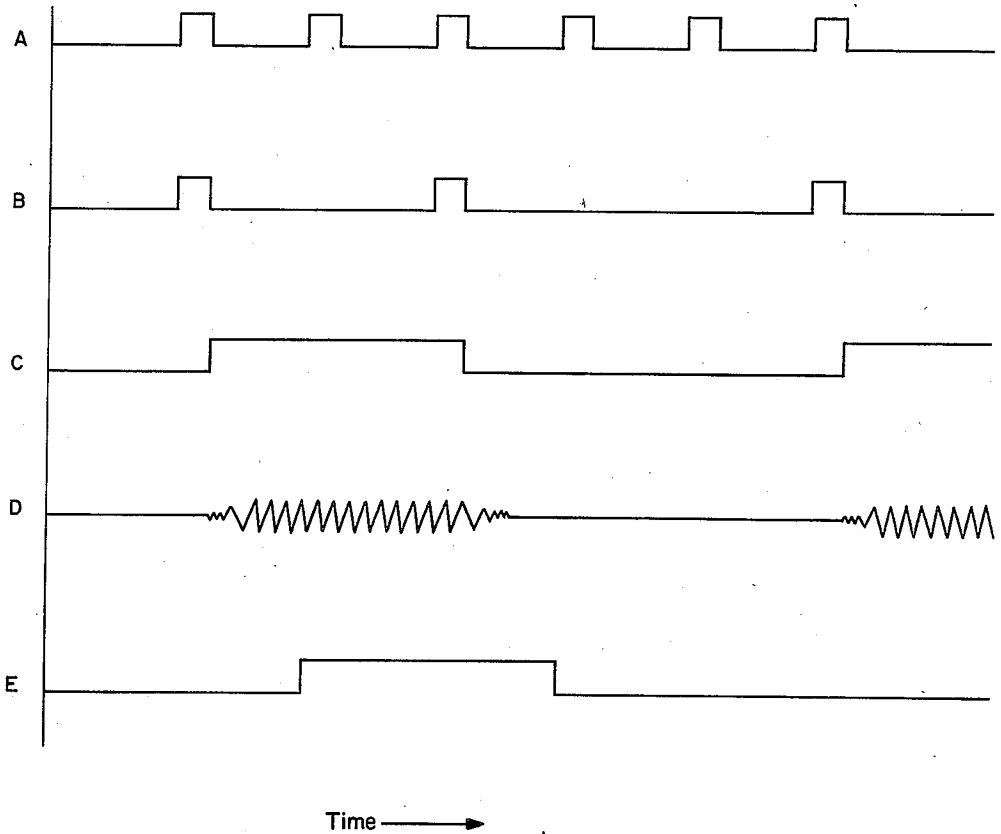
Figure 5A:
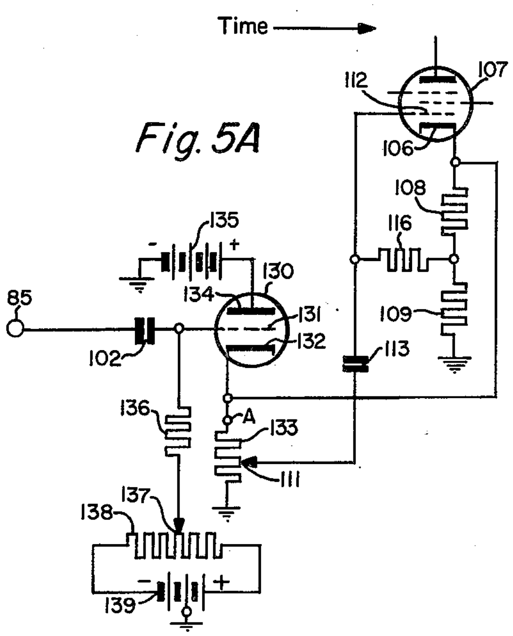
Figure 3:
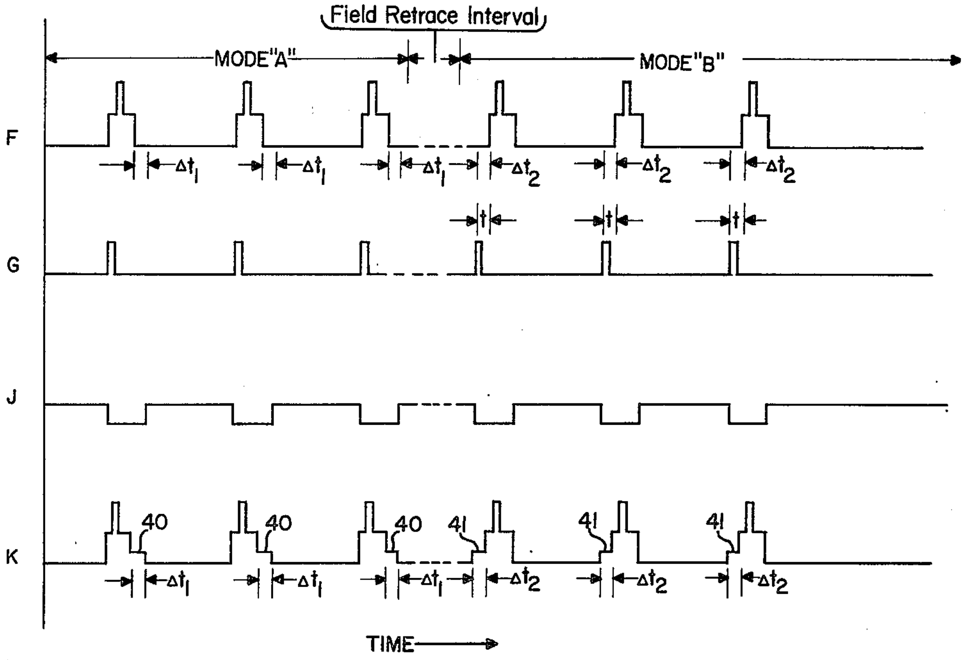
Figure 6:
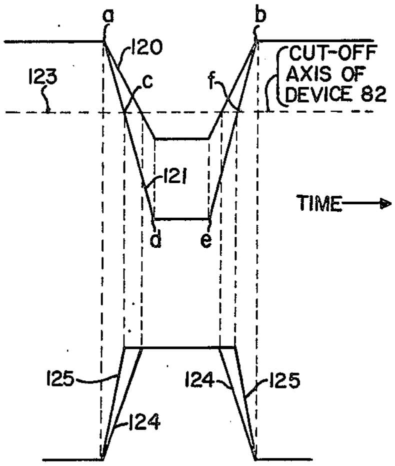
Figure 7:
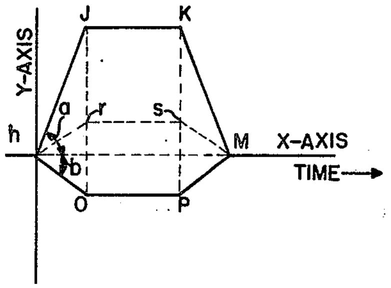
Figures 4, 5:
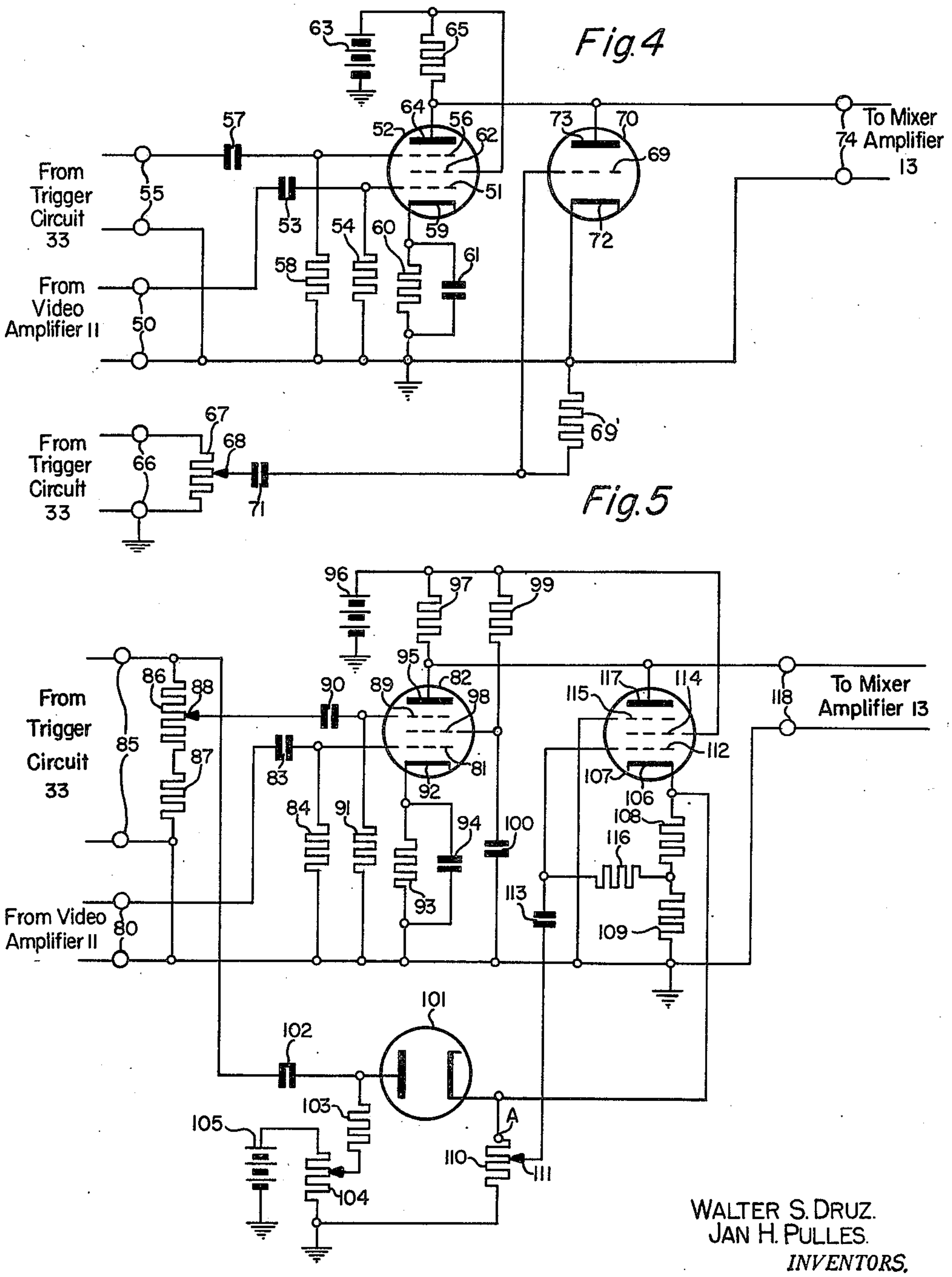

The features of this invention which are believed to be new are set forth with particularity in the appended claims. The invention itself, however, together with further objects and advantages thereof may best be understood by reference to the following description when taken in conjunction with the accompanying drawings, in which:

Figure 1 represents a subscription television transmitter which incorporates the present invention, Figures 2 and 3 comprise various curves useful in explaining the operation of the transmitter of Figure 1, Figures 4 and 5 represent various embodiments of the blanking circuit of this invention, Figure 5A shows a preferred modified construction for a portion of the circuit of Figure 5, and, Figures 6 and 7 comprise curves useful in the understanding of the operation of the circuit of Figures 5 and 5A.

The television system of Figure 1 includes a picture-converting device 10 which may be of any well-known type. The device 10 is connected to a video amplifier 11 which, in turn, is connected to a video-blanking stage 12, constructed in accordance with the present invention and described in detail hereinafter. The output terminals of stage 12 are connected to a mixer amplifier 13 having output terminals connected to a background-reinsertion device 14. The device 14 is connected to a carrier-wave generator and modulator 15 which may be coupled to a suitable antenna circuit 16, 17. The transmitter system further includes a synchronizing-signal and pedestal generating unit 18 connected to mixer amplifier 13 to supply line- and field-synchronizing and pedestal pulses thereto. The unit 18 is also connected to a field-sweep generator 19 and supplies field-synchronizing pulses to this generator. The field-sweep generator 19 is connected to the field-deflection elements 20 of converting device 10. The unit 18 is also connected to a frequency divider 21 and supplies field-synchronizing pulses thereto. The frequency divider 21 is preferably of the random type disclosed in copending application Serial No. 32,457, filed June 11, 1948, and issued March 11, 1952, as Patent 2,588,413, in the name of Erwin M. Roschke, entitled "Random Frequency Divider" and assigned to the present assignee. The output terminals of frequency divider 21 are connected to a multivibrator 22 which, in turn, is connected to a key-signal generator 23, the key-signal generator being connected to a line circuit 24 extending to various subscriber receivers.

The unit 18 is also connected to a control circuit 25 and supplies field-synchronizing pulses thereto, the control circuit 25 being connected to a keying circuit 27 and being further connected to the output terminals of key-signal generator 23 by way of leads 26. The unit 18 is connected to keying circuit 27 by way of leads 28 and supplies line-synchronizing pulses to this keying circuit. The output terminals of keying circuit 27 are connected to a line-sweep generator 29 by means of leads 30, and the output terminals of generator 29 are connected to the line-deflection elements 31 of device 10. The leads 30 are also connected to the input terminals of a trigger circuit 33. The output terminals of trigger circuit 33 are connected to video-signal blanking stage 12 by way of leads 34 and *34a*.

The picture-converting device 10 generates a video signal representing a subject scanned thereby, and this video signal is amplified in video amplifier 11, translated through video-signal blanking stage 12, and mixed with synchronizing and pedestal pulses from unit 18 in mixer amplifier 13. The resulting television signal is adjusted as to background level in device 14 and is modulated on a suitable carrier wave in unit 15 for radiation by means of antenna 16, 17. Field-synchronizing pulses from unit 18 are applied to field-sweep generator 19 to control the field scansion of device 10. Line-synchronizing pulses from unit 18 are applied to line-sweep generator 29 by way of keying circuit 27 to control the line scansion of the picture converting device.

Field-synchronizing pulses from unit 18, as shown in curve A of Figure 2, are impressed on frequency divider 21. Frequency-divided pulses derived from divider 21 are shown in curve 2B, and are used to trigger multivibrator 22. The multivibrator is, preferably, of the well-known "Eccles Jordan" type, that is, a multivibrator circuit that may be triggered between two stable operating conditions by successive pulses of like polarity. The output pulses from multivibrator 22 are shown in curve 2C, these pulses being used to actuate key-signal generator 23. The key-signal generator produces a burst of key signal, as shown in curve 2D, on line circuit 24 in response to each positive-pulse component from multivibrator 22. In this manner, a burst of key signal is generated on line circuit 24 during spaced operating intervals, these operating intervals occurring preferably at random times and each burst being initiated and terminated by frequency-divided field-synchronizing pulses and, thus, during field-retrace intervals.

The bursts of key signal from generator 23 are further impressed on control circuit 25 by way of leads 26. The control circuit is so constructed that it is actuated from one operating condition to another by the field-synchronizing pulse succeeding the initiation of each key signal burst, and returned to the first operating condition by the field-synchronizing pulse succeeding the termination of each key-signal burst. The control circuit impresses control pulses, such as shown in curve 2E, on keying circuit 27 to actuate this keying circuit. The keying circuit acts to alter the timing of the line-synchronizing pulses translated therethrough by a preselected amount in response to each control pulse from control circuit 25. This causes the timing of the line scansion of device 10 to be altered by a corresponding amount during spaced intervals and, hence, causes an alteration in the timing of the video signal generated thereby relative to the line-synchronizing pulses generated by unit 18 and mixed with the video signal in mixer 13. In this manner, the television signal radiated by antenna circuit 16, 17 is coded and standard television receivers are unable to reproduce the intelligence represented thereby since such receivers require an invariable time relation of video to synchronizing information to synthesize an intelligible image.

Due to the fact that the control pulses supplied to keying circuit 27 from control circuit 25 are initiated and terminated by field-synchronizing pulses and, thus, during field-retrace intervals, the timing changes of the line-synchronizing pulses impressed on line-sweep generator 29 also occur during field-retrace intervals. This precludes any distortion in the image reproduced in subscriber receivers that might occur should these timing changes take place during field-trace intervals. Moreover, an examination of curves D and E of Figure 2 reveals that each key-signal burst, representing a change in the mode of operation of the transmitter, is transmitted to the subscriber receivers over line circuit 24 by an interval corresponding to approximately one field-trace interval before the actual change is effected by the corresponding pulse of curve E. Because of this, slight time delays of the key signal that might occur in the line circuit may be tolerated with no adverse effect on the proper operation of the subscription system.

The components of the subscription television transmitter thus far referred to with the exception of units 12, 25 and 27 are well-known to the art and further description thereof is deemed to be unnecessary. The construction of control circuit 25 and keying circuit 27 is described in great detail in copending application Serial No. 79,432, filed March 3, 1949, and issued March 24, 1953, as Patent 2,632,799, in the name of Albert Cotsworth III et al., and assigned to the present assignee. The present invention is directed to suitable improved circuits for blanking stage 12, and is not concerned with units 25, 27 per se and it is believed unnecessary to include a detailed description of these units herein.

Curve F of Figure 3, represents the line-synchronizing pulses pedestalled on suitable pedestal pulses and supplied to mixer amplifier 13. The jittered line-synchronizing pulses, that is to say pulses with a changing time relation, derived from keying circuit 27 are shown in curve G. During one mode of operation of the transmitter, designated mode "A," pulses are derived from keying circuit 27 with no change in timing and occur with their respective leading edges in time coincidence with the leading edges of corresponding pedestal pulses of curve F. However, during the second mode of operation, designated mode "B," the pulses derived from keying circuit 27 are advanced a time $t$ relative to the pulses derived during mode "A." As previously described, the mode "B" operation of the system occurs during the spaced intervals when control circuit 25 applies a pulse to keying circuit 27.

During the mode "B" operation of the transmitter, since the line-synchronizing pulses are advanced by the time $t$, the line scansion of device 10 is advanced a corresponding amount. This causes an advance in the timing of the video signal generated by device 10 relative to the line-synchronizing and pedestal components as applied to mixer amplifier 13 and shown in curve F. Such timing changes in the video signal relative to the synchronizing pulses of the radiated composite television signal have been found to provide effective coding of the television broadcast. However, it may be shown that there is a picture or video unbalance in the composite signal derived from mixer 13. Specifically, at the start of each line trace during mode "A" operation there is a short interval $\Delta t_1$ of video information which does not appear during mode "B" since the shift in video signal relative to the blanking pedestals causes this portion to fall within the adjacent pedestal. Additionally, there is a similar interval $\Delta t_2$ of video information at the end of each line trace during mode "B" operation which does not appear in the mode "A" since it, likewise, falls within the adjacent pedestal. This gives rise to an unbalance of picture content as the timing of the video components changes relative to the synchronizing and pedestal components in accordance with the coding schedule which determines the shift in modes of operation. Under some conditions, this change in picture content may cause distortion in the image reproduced by subscriber receivers. The purpose of transmitter stages 12 and 33 is to blank out the portions of the video signal which appear in one mode but not in the other. These portions are replaced by blanking pulses that have an amplitude extending, preferably, to some intermediate shade level of the video signal, such as gray, to prevent unauthorized synchronization on these blanking components.

The jittered synchronizing pulses from keying circuit 27 are applied to trigger circuit 33 to control the operation thereof and produce the pulses shown in curve J.

Trigger circuit 33 may take the form of a blocking oscillator constructed in a manner well-known to the art. Preferably, it contains a width control for adjusting the width of its output pulses which are applied to video blanking stage 12. This stage is adjusted, in a manner to be described, so that the signal derived from mixer amplifier 13, as shown in curve K, includes pulses 40 during mode "A" operation and pulses 41 during mode "B" operation, these pulses preferably having an amplitude corresponding to the gray level of the video signal as previously mentioned.

Pulses 40 overlap the line-synchronizing pedestal pulses and extend beyond the trailing edge thereof by an amount determined by the trailing edge of the pulses of curve J which, in turn, is governed by the width adjustment of trigger circuit 33. Preferably, the width adjustment causes the projecting portions of pulses 40 to occur in the intervals $\Delta t_1$ and blank out the video information of such intervals. Similarly, pulses 41 overlap and project beyond the leading edges of the line-pedestal pulses to blank out video information in the intervals $\Delta t_2$. This time relation is controlled by the pulses of curve G which are delivered by keying circuit 27 to trigger circuit 33 to control the initiation of the pulses generated thereby. In this manner, the previously described distortion that sometimes occurs in subscription television systems due to the inequality of picture content in different modes of operation is eliminated.

A television transmitter in which pulses, such as pulses 40 and 41 of curve K, are included in the radiated signal to obviate certain distortion therein is fully disclosed in copending application 31,345. The present invention is directed to improved circuits constituting the video-blanking stage 12, and these circuits are now to be described in detail.

A simplified embodiment of the blanking circuit of this invention, as shown in Figure 4, includes a pair of input terminals 50 connected to video amplifier 11. One of terminals 50 is connected to ground and the other is connected to a control electrode 51 of an electron-discharge device 52 through a coupling capacitor 53, the control electrode being connected to ground through a grid-leak resistor 54. The circuit includes a second pair of input terminals 55 connected to trigger circuit 33 over leads 34 to derive negative-polarity pulses therefrom. One of terminals 55 is connected to ground and the other is coupled to a second control electrode 56 of device 52 through a coupling capacitor 57, electrode 56 being connected to ground through a grid-leak resistor 58. The cathode 59 of device 52 is connected to ground through a resistor 60 which is shunted by a by-pass capacitor 61. The screen grid 62 of device 52 is connected to the positive terminal of a source of unidirectional potential 63, and anode 64 is connected to this terminal through a load resistor 65.

The blanking circuit includes a third pair of input terminals 66 connected to trigger circuit 33 over leads 34a to derive positive-polarity pulses therefrom occurring in time coincidence with the negative pulses on leads 34. One of terminals 66 is connected to ground and to one extremity of a potentiometer 67, and the other is connected to the other extremity of this potentiometer. The potentiometer 67 has an adjustable tap 68 associated therewith, and this tap is coupled to control electrode 69 of an electron-discharge device 70 through a coupling capacitor 71, the control electrode being connected to ground through grid-leak resistor 69'. The cathode 72 of device 70 is directly connected to ground and the anode 73 of this device is connected to anode 64 of devce 52. The circuit includes a pair of output terminals 74 which may be connected to mixer amplifier 13 of Figure 1. One of terminals 74 is connected to ground, and the other is connected to anodes 64, 73.

The circuit of Figure 4 is so constructed that during the intervals between the pulses produced by trigger circuit 33, device 52 is conductive and device 70 is non-conductive. During these intervals, the video signal from video amplifier 11, which is applied across terminals 50, is amplified by device 52 and appears across output terminals 74 for application to mixer amplifier 13. For the duration of each pulse from trigger circuit 33, however, the negative-polarity pulse impressed across input terminals 55 drives control electrode 56 in a negative direction and renders device 52 non-conductive to the video signal. With device 52 non-conductive, the signal level represented by its anode potential is a fixed shade value and may be considered to correspond to black. Accordingly, the signal potential at output terminals 74, due solely to the presence of the negative pulse on electrode 56, is that of black level irrespective of the instantaneous value of the video signal on electrode 51. In this manner, a blanking pulse is introduced during the intervals of the control pulses applied to electrode 56. It is desirable that the blanking pulse represents a shade level of intermediate value and that is accomplished by device 70, the circuit of which may be considered a control network and which receives a control pulse of positive polarity and adjustable amplitude during the blanking interval. This control pulse appears with negative polarity in the common output circuit of devices 52 and 70 and is superposed on the afore-described blanking pulse which is of positive polarity. Adjustment of tap 68 controls the amplitude of the resultant blanking pulse appearing at output terminals 74. Preferably, the tap adjustment is such that the resultant pulse is of positive polarity and has an amplitude corresponding to gray level of the video signal.

Accordingly, with the blanking circuit interposed between video ampplifier 11 and mixer amplifier 13 of Figure 1 and actuated by trigger circuit 33, desired portions of each line-trace interval of the video signal may be blanked and replaced by blanking pulses of a controllable amplitude. Since jittered synchronizing pulses shown in curve G control the timing of trigger circuit 33 and vary its timing with changes in operating mode of the transmitter, the portions of the video line-trace intervals blanked are altered to maintain an equality of picture content in successive fields regardless of the mode of operation.

The blanking circuit of Figure 4 has been found to operate with a high degree of efficiency. However, in some instances it has been found that slight distortions may be introduced into the television signal due to transient effects that occur upon the super-positioning of the pulses from the devices 52 and 70 in their common output circuit. These transients exist if the negative-polarity pulses produced by device 70 have slightly different characteristics from the positive-polarity pulses produced by device 52. That is, slight differences in the width of these pulses sometimes gives rise to transients in the form of sharp peaks at the leading or trailing edges of the superposed pulses.

The modified form of blanking circuit illustrated in Figure 5 is constructed to eliminate such transients. This embodiment includes a pair of input terminals 80 which may be connected to video amplifier 11 of Figure 1. One of terminals 80 is connected to ground and the other is coupled to a control electrode 81 of an electron-discharge device 82 through a coupling capacitor 83, the control electrode being connected to ground through a grid-leak resistor 84. The circuit further includes a second pair of input terminals 85 which may be connected to trigger circuit 33. One of terminals 85 is connected to ground and to one extremity of a potentiometer comprised of resistors 86 and 87. The other terminal 85 is connected to the other extremity of this potentiometer. The resistor 86 has a movable tap 88 which is coupled to a second control electrode 89 of device 82 through a coupling capacitor 90, control electrode 89 being connected to ground through a grid-leak resistor 91.

The cathode 92 of device 82 is connected to ground through a resistor 93 shunted by a by-pass capacitor 94. The anode 95 of device 82 is connected to the positive terminal of a source of unidirectional potential 96 through a load resistor 97. The screen electrode 98 of device 82 is connected to source 96 through a resistor 99 and is by-passed to ground through a capacitor 100.

The ungrounded input terminal 85 is coupled to the anode of a diode 101 through a coupling capacitor 102. This anode is connected through a resistor 103 to a movable tap on a potentiometer 104, connected across a unidirectional potential source 105. The cathode of diode 101 is directly coupled to the cathode 106 of an electron-discharge device 107, this latter cathode being connected to ground through series-connected resistors 108, 109. The cathode of device 101 is connected to ground through a resistor 110 which has a movable tap 111 coupled to a control electrode 112 of device 107 through a coupling capacitor 113. The screen electrode 114 of device 107 is connected to source 96 and the suppressor electrode 115 is connected to ground. The junction of control electrode 112 and capacitor 113 is connected to the junction of cathode resistors 108 and 109 through a grid-leak resistor 116. The anode 117 of device 107 is connected to anode 95 of device 82 and to one of the output terminals 118, the other output terminal being grounded. The output terminals may be connected to mixer amplifier 13 of Figure 1.

In the intervals between the negative-polarity pulses from trigger circuit 33, device 82 is conductive and amplifies the video signal applied across terminals 80 and applies the amplified video signal to output terminals 118. The negative-polarity pulses from trigger circuit 33 are impressed across terminals 85 and are applied to control electrode 89 through coupling capacitor 90. The amplitude of these pulses, as applied to control electrode 89, is determined by the adjustment of tap 88 on potentiometer 86. The resistor 87 is included in series with resistor 86 so that even with minimum amplitude adjustment of tap 88 the pulses applied to control electrode 89 have sufficient amplitude to render the device non-conductive to the video signal.

Various wave forms for one of the pulses applied to control electrode 89 are shown in Figure 6. The wave form 120 shows this pulse with a certain amplitude as determined by a selected setting of tap 88, and the wave form 121 shows the pulse with an increased amplitude corresponding to a second setting of tap 88. The cut-off axis of device 82 is shown by the line 123, and the positive-polarity blanking pulses appearing in the anode circuit of the device due, respectively, to the pulses 120 and 121 are designated 124 and 125. Variations in the amplitude of the pulses applied to control electrode 89 by adjustment of tap 88 do not affect the amplitude of the corresponding blanking pulses appearing in the anode circuit of device 82, but affect merely the slope thereof.

The negative polarity pulses applied to terminals 85 from trigger circuit 33 establish similar pulses of like polarity across load impedance 110 of diode 101 in a manner to be described hereinafter. The pulses from impedance 110 are applied with controllable amplitude to device 107 and appear in the anode circuit thereof with negative polarity. This obtains since negative-polarity pulses are impressed across cathode resistors 108, 109 to render device 107 conductive, and are concurrently impressed on control electrode 112 by way of potentiometer tap 111 so that the effective amplitude of these pulses as applied to device 107 may be controlled.

Resistor 109 is included in the cathode circuit of device 107 to reduce the loading of this circuit on potentiometer 110. Device 107 is preferably a pentode so that its anode-cathode and anode-grid capacitances may be a minimum to prevent differentiation of the pulses translated by this device. Since identical pulses are applied to devices 82 and 107 in the circuit of Figure 5, the initiation time *a* and termination time *b* (Figure 6) of each of these pulses coincide in both the input circuits of these devices.

As shown in Figure 6, a portion of each of the pulses applied to control electrode 81 of device 82 is clipped in its translation by this device. In order to prevent the aforementioned transient effects in the output signal derived from the blanking circuit, a similar portion of the pulses applied to device 107 is also clipped in the circuit of diode 101. A variable positive bias is applied to the anode of this diode by adjustment of the tap on potentiometer 104 to render diode 101 normally conductive. Adjustment of the tap of potentiometer 104 determines the amplitude level of a negative-polarity pulse required to drive the diode to cut-off or, expressed differently, determined the clipping level of the diode circuit. Consequently, the potentiometer permits a desired portion of each of the negative-polarity pulses to be clipped in the diode circuit prior to its application to discharge device 107.

With further reference to Figure 6, tap 88 may be adjusted to a position wherein each pulse from trigger circuit 33 is applied to control electrode 89 with the wave form *acuefb* in which case the positive-polarity blanking pulse 125 is developed in the anode circuit of device 82. The tap 111 may be adjusted so that each negative-polarity pulse from trigger circuit 33 produces a negative-polarity pulse in the anode circuit of device 107 with appropriate amplitude to combine with the positive-polarity blanking pulse from device 82 and develop at output terminals 118 a resultant blanking pulse of positive-polarity, representing a gray shade level as explained in connection with the arrangement of Figure 4.

In adjusting this modification of the blanking circuit, potentiometers 86, 104 and 110 are varied to satisfy the following conditions: (1) The relative amplitude of the blanking pulses developed in the common output circuit of devices 82 and 107 provide the desired ultimate blanking pulse representing a preselected shade level of the picture intermediate the extreme values of white and black; and (2) The pulses from devices 82 and 107 that are combined in forming the ultimate blanking pulse have as identical widths and time coincidence as practically feasible so that their superpositioning introduces a minimum of transient phenomena.

The wave forms of Figure 7 illustrate the individual pulses produced by devices 82 and 107 when the above-described adjustments have been made. Each pulse from trigger circuit 33 produces a positive-polarity pulse *hjkm* in the anode circuit of device 82 and simultaneously produces a negative-polarity pulse *hopm* in the anode circuit of device 107. Since the identical pulse is applied to the input circuits of these devices, the points *h* and *m* coincide in time. Moreover, due to the previously described adjustments of the circuit, points *o* and *j*, *p* and *k* also coincide in time. The resultant positive polarity output pulse has a wave form *hrsm*. Since pulses *hjkm* and *hopm* begin in time coincidence at point *h* and reach their maximum in time coincidence at points *o* and *j*, there are no discontinuities in the leading edge of the resultant pulse *hrsm*. Similarly, since the points *p* and *k* occur in time coincidence and the pulses *hjkm* and *hopm* terminate at the common point *m*, there are no discontinuities in the trailing edge of the resultant pulse *hrsm*. Therefore, transients are eliminated from the blanking pulses generated by the circuit of Figure 5 and any distortion that may arise therefrom in the subscription television signal is obviated.

A preferred modification of the amplitude-clipping circuit coupled to device 107 is shown in Figure 5A. This modification includes a triode 130 and ungrounded terminal 85 is coupled to control electrode 131 of the triode through coupling capacitor 102. Cathode 132 of triode 130 is connected to a point of reference potential, such as ground, through a cathode resistor 133, and anode 134 thereof is directly connected to the positive terminal of a unidirectional potential source 135 whose negative terminal is connected to ground. Control electrode 131 is connected through a limiting resistor 136 to movable tap 137 on potentiometer 138 bridged across a potential source 139 having a point intermediate its positive and negative terminals connected to ground. Cathode 132 is directly connected to cathode 106 of device 107, and variable tap 111 on cathode resistor 133 is coupled to control electrode 112 through capacitor 113 as in the previously-described circuit.

Device 130 is connected as a cathode follower and provides the desired low output impedance to drive cathode 106 of device 107 without attentuation of the portion of the pulse signal translated by this stage. Adjustment of movable tap 137 varies the clipping level of device 130, and this tap may be varied through a relatively wide potential range extending from negative values through zero to positive values. As in the previously-described embodiment, tap 111 may be adjusted to provide a desired blanking-pulse level across output terminals 118, and tap 137 may be adjusted to clip a portion of each pulse applied to device 107 to prevent transients in the blanking pulse.

This invention provides, therefore, an improved video-signal-blanking stage which is relatively simple and economical to construct and which functions in an improved manner when utilized in a subscription television transmitter to compensate for distortions that might otherwise occur in the subscription signal due to the coding thereof.

While various embodiments of the invention have been shown and described, modifications may be made and it is intended in the appended claims to cover all such modifications as fall within the true spirit and scope of the invention.

We claim:

1. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signal substantially independent of such alterations in time relation between said video and synchronizing components, said video-signal blanking stage comprising: an electron-discharge device having input and output circuits; means for applying said video components to said input circuit for translation to said output circuit; means coupled to said encoding apparatus for establishing a preselected conductivity in said device during spaced intervals determined by said coding schedule to produce in said output circuit a reference potential level independent of the instantaneous value of said video signal during said intervals thereby to introduce blanking pulses in the output signal of said device; a control network having an output circuit at least partially in common with said first-mentioned output circuit for producing pulses in time-coincidence with said blanking pulses and superposed thereon to determine the effective value of said blanking pulses; and means coupled to said control network for adjusting the value of said pulses produced by said control network.

2. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video signal blanking stage comprising: an electron-discharge device having input and output circuits; means for applying said video components to said input circuit for translation to said output circuit; means coupled to said encoding apparatus for establishing a preselected conductivity in said device during spaced intervals determined by said coding schedule to produce in said output circuit during said intervals a reference potential level corresponding to black shade value of said video signal and independent of the instantaneous value thereof thereby to introduce blanking pulses in the output circuit of said device; a control network having an output circuit at least partially in common with said first-mentioned output circuit for producing pulses in time-coincidence with said blanking pulses but of opposite polarity and superposed thereon to reduce the effective value of said blanking pulses; and means coupled to said control network for adjusting the value of said pulses produced by said control network thereby to reduce the effective value of said blanking pulses to a level corresponding to gray shade value of said video signal.

3. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video-signal blanking stage comprising: a first electron-discharge device; a first input circuit coupled to said device for impressing said video components thereon; a second input circuit coupled to said device and to said encoding apparatus for impressing pulses thereon occurring at times determined by said coding schedule and with a polarity to render said device non-conductive throughout the duration of each of said pulses; an output circuit coupled to said device for deriving therefrom said video signal and interposed blanking pulses occurring in time-coincidence with said first-mentioned pulses; a second electron-discharge device coupled to said output circuit; and a further input circuit coupled to said second discharge device for applying pulses thereto in time coincidence with said first-mentioned pulses to cause said second device to produce pulses in said output circuit superposed on said blanking pulses to alter the effective amplitude of said blanking pulses.

4. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video-signal blanking stage comprising: a first electron-discharge device; a first input circuit coupled to said device for impressing said video components thereon; a second input circuit coupled to said device and to said encoding apparatus for impressing pulses thereon occurring at times determined by said coding schedule and with a polarity to render said device non-conductive for the duration of each of said pulses; an output circuit coupled to said device for deriving therefrom said video signal and interposed blanking pulses occurring in time-coincidence with said first-mentioned pulses; a second electron-discharge device coupled to said output circuit; a further input circuit coupled to said second discharge device for applying pulses thereto in time coincidence with said first-mentioned pulses to cause said second device to produce output pulses in said output circuit superposed on said blanking pulses; and means for controlling the amplitude of said output pulses of said second device selectively to adjust the effective amplitude of said blanking pulses.

5. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video-signal blanking stage comprising: a first electron-discharge device; a first input circuit coupled to said device for impressing said video components thereon; a second input circuit coupled to said device and to said encoding apparatus for impressing pulses thereon occurring at times determined by said coding schedule and with a polarity to render said device non-conductive for the duration of each of said pulses; an output circuit coupled to said device for deriving therefrom said video signal and interposed blanking pulses occurring in time-coincidence with said first-mentioned pulses; a second electron-discharge device coupled to said output circuit; a further input circuit coupled to said second discharge device for applying pulses thereto in time coincidence with said first-mentioned pulses to cause said second device to produce output pulses in said output circuit superposed on said blanking pulses; and amplitude-control means included in said further input circuit for varying the amplitude of said output pulses of said second discharge device selectively to alter the effective amplitude of said blanking pulses.

6. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video-signal blanking stage comprising: a first electron-discharge device; a first input circuit coupled to said device for impressing said video components thereon; a second input circuit coupled to said device and to said encoding apparatus for impressing pulses thereon occurring at times determined by said coding schedule and with a polarity to render said device non-conductive throughout the duration of each of said pulses; an output circuit coupled to said device for deriving therefrom said video signal and interposed blanking pulses occurring in time-coincidence with said first-mentioned pulses; a second electron-discharge device coupled to said output circuit; and a further input circuit coupled to said second discharge device for applying pulses thereto of such polarity as to cause said second device to produce pulses in said output circuit in time-coincidence with said blanking pulses but of opposite polarity thereto to alter the effective amplitude of said blanking pulses.

7. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signals substantially independent of such alterations in time relation between said video and synchronizing components, said video-signal blanking stage comprising: a first electron-discharge device; a first input circuit coupled to said device for impressing said video components thereon; a second input circuit coupled to said device and to said encoding apparatus for impressing negative-polarity pulses thereon occurring at times determined by said coding schedule to render said device non-conductive throughout the duration of each of said pulses; an output circuit coupled to said device for deriving therefrom said video signal and interposed positive-polarity blanking pulses occurring in time-coincidence with said first-mentioned pulses; a second electron-discharge device coupled to said output circuit; and a further input circuit coupled to said second discharge device for applying pulses thereto in time coincidence with said first-mentioned pulses and of such polarity as to cause said second device to produce negative-polarity pulses in said output circuit superposed on said positive-polarity blanking pulses to alter the effective amplitude of said blanking pulses.

8. A video-signal blanking stage comprising: a source of time spaced pulses; a first electron-discharge device; a first input circuit coupled to said device for impressing a video signal thereon; a second input circuit for said device coupled to said pulse source for impressing pulses thereon with a polarity to render said device non-conductive to said video signal; an output circuit coupled to said device for deriving therefrom said video signal and interposed blanking pulses occurring in time coincidence with said first-mentioned pulses; a second electron-discharge device coupled to said output circuit; an input circuit for said second discharge device coupled to said pulse source for applying said first-mentioned pulses thereto with such polarity as to cause said second device to produce pulses in said output circuit in time-coincidence with said blanking pulses but of opposite polarity thereto; and an amplitude-clipper included in said last-mentioned input circuit for shaping each of said first-mentioned pulses as applied to said second discharge device to match said blanking pulses.

9. A video-signal blanking stage comprising: a source of time spaced pulses; a first electron-discharge device; a first input circuit coupled to said device for impressing a video signal thereon; a second input circuit for said device coupled to said pulse source for impressing pulses thereon with a polarity to render said device non-conductive throughout the duration of each of said pulses; a control circuit included in said second input circuit for adjusting the amplitude of said pulses as applied to said device; an output circuit coupled to said device for deriving therefrom said video signal and interposed blanking pulses occurring in time coincidence with said first-mentioned pulses; a second electron-discharge device coupled to said output circuit; an input circuit for said second discharge device coupled to said pulse source for applying said first-mentioned pulses thereto with such polarity as to cause said second device to produce pulses in said output circuit in time-coincidence with said blanking pulses but of opposite polarity thereto; a control circuit included in said last-mentioned input circuit for varying the amplitude of said pulses produced by said second discharge device thereby to alter the amplitude of said blanking pulses; an amplitude-clipper included in said last-mentioned input circuit for shaping each of said pulses applied to said second discharge device; and adjustable means coupled to said clipper circuit for controlling said clipper circuit, thereby to match said blanking pulses and said pulses produced by said second device.

10. In a subscription television system including encoding apparatus for encoding a composite video signal by altering the time relation between the video and synchronizing components of said composite video signal in accordance with a predetermined coding schedule, a video-signal blanking stage for introducing auxiliary blanking components to render the average level of said encoded composite video signal substantially independent of such alterations in time relation between said video and synchronizing components, said video-signal blanking stage comprising: an electron-discharge device having input and output circuits; means for applying said video components to said input circuit for translation to said output circuit; means coupled to said encoding apparatus for establishing a preselected conductivity in said device during spaced intervals determined by said coding schedule to produce in said output circuit a reference potential level independent of the instantaneous value of said video signal during said intervals thereby to introduce blanking pulses in the output signal of said device; a control network having an output circuit coupled to said first-mentioned output circuit for producing and introducing pulses in time coincidence with said blanking pulses and superposed thereon to determine the effective value of said blanking pulses; and means for adjusting the amplitude value of said pulses produced by said control network.

References Cited in the file of this patent

UNITED STATES PATENTS

| Number | Name | Date |
|---|---|---|
| 2,305,902 | Schroeder | Dec. 22, 1942 |
| 2,315,388 | Bedford | Mar. 30, 1943 |
| 2,346,509 | Rutherford | Apr. 11, 1944 |